United States Patent
Hayashi et al.

(10) Patent No.: US 6,777,843 B2
(45) Date of Patent: Aug. 17, 2004

(54) RESOLVER INTEGRATED TYPE MOTOR

(75) Inventors: Yasukazu Hayashi, Niwa-gun (JP);
Noriyuki Fukui, Niwa-gun (JP)

(73) Assignee: Okuma Corporation, Niwa-gun (JP)

( * ) Notice: Subject to any disclaimer, the term of this patent is extended or adjusted under 35 U.S.C. 154(b) by 12 days.

(21) Appl. No.: 10/255,605

(22) Filed: Sep. 27, 2002

(65) Prior Publication Data

US 2003/0067233 A1 Apr. 10, 2003

(30) Foreign Application Priority Data

Oct. 5, 2001 (JP) ........................................ 2001-310503

(51) Int. Cl.$^7$ ............................................. H02K 17/42
(52) U.S. Cl. ...................... 310/168; 310/216; 310/40 R
(58) Field of Search ............................ 310/67 R, 40 R, 310/168; 336/156

(56) References Cited

U.S. PATENT DOCUMENTS

| | | | | |
|---|---|---|---|---|
| 4,508,984 A | * | 4/1985 | Guedj et al. | 310/14 |
| 4,631,510 A | * | 12/1986 | Nagarkatti et al. | 336/135 |
| 4,980,594 A | * | 12/1990 | Poro | 310/168 |
| 5,300,884 A | * | 4/1994 | Maestre | 324/207.25 |
| 5,705,872 A | * | 1/1998 | Loge | 310/161 |
| 5,763,976 A | * | 6/1998 | Huard | 310/168 |
| 5,903,205 A | * | 5/1999 | Goto et al. | 336/130 |
| 6,118,201 A | * | 9/2000 | Dulin et al. | 310/161 |
| 6,225,715 B1 | * | 5/2001 | Hoda et al. | 310/67 R |
| 2003/0067233 A1 | * | 4/2003 | Hayahi et al. | 310/90 |

FOREIGN PATENT DOCUMENTS

| | | | | |
|---|---|---|---|---|
| JP | 59215774 | * | 10/1984 | G01L/3/10 |
| JP | U-3-3168 | | 1/1991 | |
| JP | U-5-29282 | | 4/1993 | |
| JP | 08327223 | * | 12/1996 | G01D/5/245 |
| JP | A-9-65617 | | 3/1997 | |
| JP | A 11-289717 | | 10/1999 | |
| JP | A 2001-4405 | | 1/2001 | |
| JP | 200227719 | * | 1/2002 | H02K/24/00 |

* cited by examiner

Primary Examiner—Nicholas Ponomarenko
Assistant Examiner—Heba Elkassabgi
(74) Attorney, Agent, or Firm—Oliff & Berridge, PLC

(57) ABSTRACT

A resolver-integrated motor has a radial irregular shape which is formed at an end on a non-load side of its motor shaft. This radial irregular shape is used as a resolver rotor. The radial irregular shape is formed by grinding or turning the motor shaft made of a carbon steel material in the same holding state as portions in which a bearing on a load side and a bearing on the non-load side are inserted. Accuracy of rotation center position of the resolver rotor to the motor shaft can be greatly improved, and detection accuracy does not require precise assembly of the resolver stator yoke to the motor bracket. The resolver stator yoke can be directly fixed to the motor bracket an intermediate part. A compact and inexpensive motor having a resolver is provided without sacrificing the accuracy of position detection.

4 Claims, 5 Drawing Sheets

RESOLVER INTEGRATED TYPE MOTOR

BACKGROUND OF THE INVENTION

1. Field of the Invention

The present invention relates to a resolver integrated type motor, more specifically a motor to which is integrated a resolver for detecting an angular position or speed around a shaft.

2. Related Art

There is a great demand for improvement of driving performance, reduction of size, and reduction of cost of motors, especially for those used as a power source in various types of machines. In order to improve the driving performance of a motor, it is effective to dispose a resolver or an equivalent detector (hereinafter referred to as the "resolver") for detecting an angular position or a speed around a motor shaft or of a rotor and to feedback the resolver output to control and drive systems so to make feedback control of a rotation position and speed of the motor. In one known structure adopted to dispose a resolver on a motor, a resolver shaft is attached to the motor shaft, as shown in FIG. 3 and FIG. 4. In another type of known structure, a resolver rotor is fitted to a single shaft shared by the motor and the resolver, as shown in FIG. 5. It should be noted that, with the exception of FIG. 2, the drawings of the present application show the structure in the vicinity of the non-load side end of the motor shaft, because in general the resolver is disposed on the non-load side end opposite to the loaded side end. The loaded end, to which a load to be rotated is connected, is not shown in the drawings.

A resolver 201 shown in FIG. 3 and FIG. 4 has a structure in which the center of its shaft, hereinafter referred to as the "resolver shaft 202", and of a shaft of a motor 203, hereinafter referred to as the "motor shaft 204", are aligned and directly connected with a bolt 205, as shown in FIG. 3 which shows an axial cross section. Therefore, when the motor shaft 204 rotates, the resolver shaft 202 also rotates at the same rate. A resolver rotor 206 is fixed to an end of the resolver shaft 202. The resolver rotor 206 has a radial non-uniformity around the resolver shaft 202 as shown in FIG. 4 which shows a plan view of FIG. 3 observed from above. In an example of a 6-pole synchronous motor, the resolver rotor 206 has a shape which has a concavity and a convexity repeated at a cycle of 2π/3 [rad], namely the contour of an equilateral triangle having rounded corners, as shown in FIG. 4. The resolver rotor 206 is configured by vertically stacking silicon steel plates as shown in FIG. 3 and caulking at the points indicated by 218a, 218b and 218c as shown in FIG. 4. The resolver rotor 206 is positioned and affixed to the resolver shaft 202 during production of the resolver 201 in such a manner that the center of rotation of the resolver shaft 202 and the shape center of the motor shaft 204 coincide with that shown by the broken chain line 208 in FIG. 3. Therefore, the resolver rotor 206 accurately synchronizes with the rotation of the motor to which it is coaxially connected.

The loaded end of the motor shaft 204 is supported by a motor bracket 213 through an unshown load side bearing, and the non-load end is supported by the motor bracket 213 through a non-load side bearing 216. The resolver shaft 202 is supported by a housing 211 of the resolver 201 through bearings 207a, 207b. The housing 211 is tightened to a coupling 212 at a point which is not shown. In addition, the coupling 212 is fixed to the motor bracket 213 with bolts 215a, 215b. Therefore, the housing 211 does not rotate when the motor shaft 202 rotates. A stator yoke (hereinafter referred to as the "resolver stator yoke") 210 of the resolver 201 is fixed to the housing 211 with pan-head machine screws 217a, 217b, 217c, 217d so that the inner circumferential surface of the housing 211 is opposite to the periphery section of the resolver rotor 206, and the shape center of the resolver rotor 206 and the center of a circular curve formed by a pole tooth edges of the resolver stator yoke 210 agree with each other. The resolver stator yoke 210 is also formed by vertically stacking silicon steel plates as shown in FIG. 3 so as to create a structure corresponding to that of the resolver rotor 206. Pole teeth are formed in a circumferential direction on the inner circumferential surface of the resolver stator yoke 210. The pole teeth are tooth-shaped pits and projections on which a resolver stator winding 209 is wound, and, when the motor 203 is a 6-pole synchronous motor, 12 pole teeth are formed as shown in FIG. 4. The above structure is further covered with a cover 214 for protection.

In the structure described above, when the resolver rotor 206 rotates with the rotation of the motor, a gap between the curved side surface of the resolver rotor 206 and the pole teeth of the resolver stator yoke 210 varies. As a result, a change in inductance caused in each winding can be electrically detected from outside. From the detected result, a rotation position of the resolver rotor 206 can be detected within a range of 2π/3 [rad]. A rotation speed can be detected by monitoring the detected rotation position in time sequence and determining its change with time. Thus, a magnetic position and a speed of the motor 203 can be detected by the resolver 201.

However, the resolver 201 shown in FIG. 3 and FIG. 4 has a disadvantage in that accurate detection requires that the positional relationship between the resolver rotor 206 and the resolver stator yoke 210 be precisely set at the time of production. Among various type of errors, a connection error between the motor shaft 204 and the resolver shaft 202 can be absorbed by the coupling 212, but the bearings 207a, 207b, the coupling 212 and the shaft 202 designed specifically for the resolver 201 are required. This results in increased size and cost of the motor.

To solve the above problems, a resolver 401, which is shown its cross section taken in its axial direction in FIG. 5, may adopt a structure of normal fitting to use a common shaft for both the motor and the resolver, so to eliminate the coupling and the bearings, thereby decreasing motor size and reducing manufacturing costs.

In the resolver 401 shown in FIG. 5, a resolver shaft 402 and a motor shaft 403 are integrally formed, so that their centers coincide, as shown in the figure by the broken chain line 404. A resolver rotor 406 is formed of silicon steel plates, which have an equilateral triangle form (six poles) with rounded corners having a radial irregular shape, by stacking the plates in a vertical direction as shown in FIG. 3, and then fixing them to the resolver shaft 402 via a spacer 411. Specifically, the resolver 406 is securely adhered to the outer circumferential surface of the spacer 411 so that the center of the inner diameter of the spacer 411 and the shape center of the irregular shape of the resolver rotor 406 agree with each other, and the spacer 411 is inserted on the resolver shaft 402 by faucet joint type normal fitting. The spacer 411 is fixed to the resolver shaft 402 with a nut 405. The spacer 411 is fitted between the resolver rotor 406 and the resolver shaft 402 to prevent an unexpected stress applied to the resolver rotor 406 from disturbing magnetic detection, as would occur should the resolver rotor 406 be directly attached onto the resolver shaft 402 or attached via a normal faucet joint fitting or the like.

Meanwhile, a resolver stator yoke 412 is fixed to a housing 414 with pan head machine screws 410a, 410c so that the center of the outer circumferential surface of the housing 414 and the center of the circular shape formed by the pole tooth edges of the resolver stator yoke 412 coincide. A motor bracket 415 has a section in which a bearing 407 is placed and a section in which the outer circumference of the housing 414 is inserted, so that the coaxiality or concentricity of the two sections is very precise. The housing 414 to which the resolver stator yoke 412 is fixed is inserted into the motor bracket 415 by normal fitting and fixed with bolts 409a, 409b. The basic principle of detection is substantially the same as that in the prior art shown in FIG. 3.

Here, the prior art shown in FIG. 5 is compared with the prior art shown in FIG. 3. The resolver shown in FIG. 5 additionally requires a nut 405 and spacer 411, but does not require the shaft 202, the bearings 207a, 207b and the coupling 212 which are required in FIG. 3. As the latter components are more expensive and larger in size than the former, the resolver shown in FIG. 5 can reduce size and costs, but, because in the art shown in FIG. 5 the resolver rotor 406 and the resolver stator yoke 412 are mounted by repeating normal fitting and adjustment several times, there is a possibility that their shape centers will be deviated from the center of rotation (the broken chain line 404) of the motor 403. Such deviation may make it impossible to obtain the desired or expected rotation position or speed detection accuracy.

SUMMARY OF THE INVENTION

It is an advantage of the present invention to provide a compact and inexpensive resolver-integrated motor in which accuracy of position detection is assured by eliminating any necessity of trading off between a relatively large and expensive structure such as those of FIG. 3 and FIG. 4 and a smaller, more inexpensive structure with less reliable detection accuracy such as that shown in FIG. 5.

A resolver-integrated motor or a motor-integrated resolver according to one aspect of the present invention is provided with a motor bracket, a motor shaft and a resolver stator yoke. The motor shaft made of a magnetic material is configured opposite the motor bracket with a prescribed gap between them, and is provided with a radial irregular section on a part of its surface. Further, the resolver stator yoke is fixed to the motor bracket in such a way as to oppose the radial irregular section of the motor shaft. Namely, the embodiment of the present invention has the radial irregular section, which is formed on the motor shaft, as a resolver rotor, and the resolver integrally formed with the motor.

As a result, a resolver with a rotor structure integral with and not separable from the motor shaft is produced. With such a configuration, it is not necessary to incorporate a resolver rotor or the like which is independent of the motor shaft, the accuracy of rotation center position of the resolver rotor to the motor shaft can be improved signifiacntly, and assembly of the resolver stator yoke does not require as a high precision to ensure detection accuracy. In other words, the resolver stator yoke can be directly fixed to the motor bracket without an intervening member such as a coupling (see FIG. 3) because the center deviation of the rotating member serves us a resolver rotor is avoided, and highly accurate detection of a position is possible. Thus, the housing for the resolver which was essential in the prior art can be eliminated, and reduction of size and costs can be realized.

According to a preferable embodiment of the present invention, a bearing for supporting the motor shaft by the motor bracket is disposed so to position adjacent to a portion of the motor shaft, which functions as the resolver rotor. A member is disposed for fixing the resolver stator yoke to the motor bracket with the outer circumferential surface of the bearing used as a guide surface. According to another preferable embodiment of the present invention, on the motor shaft, at least a portion where the bearing is disposed and a portion which functions as the resolver rotor are ground or turned in the same holding state or equivalent state so that their coaxiality or concentricity meets or surpasses a prescribed tolerance level of precision. Thus, when the motor shaft and the resolver rotor which is integral with it are produced, the accuracy of rotation center position of the resolver rotor to the motor shaft can be greatly improved with relative ease. Not only can the coupling be eliminated, but the shaft and bearing for the resolver (FIG. 3) and the spacer (FIG. 5) are also not required, and the number of associated bolts, nuts, and the like can be reduced correspondingly. In this respect also, the present invention is effective for reduction of costs. The motor shaft and the resolver rotor may be made of a carbon steel material.

DETAILED DESCRIPTION OF THE PREFERRED EMBODIMENT

Figure 1:
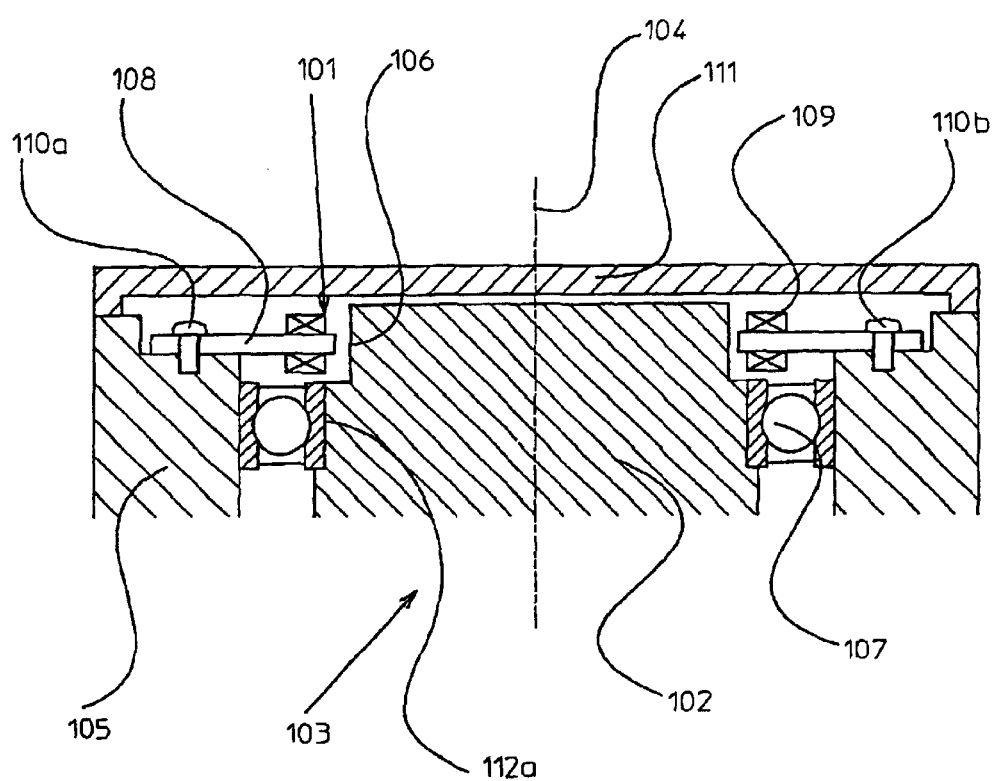
FIG. 1 is a sectional diagram of a resolver configuring section of a motor having a resolver according to one embodiment of the present invention.
Figure 2:
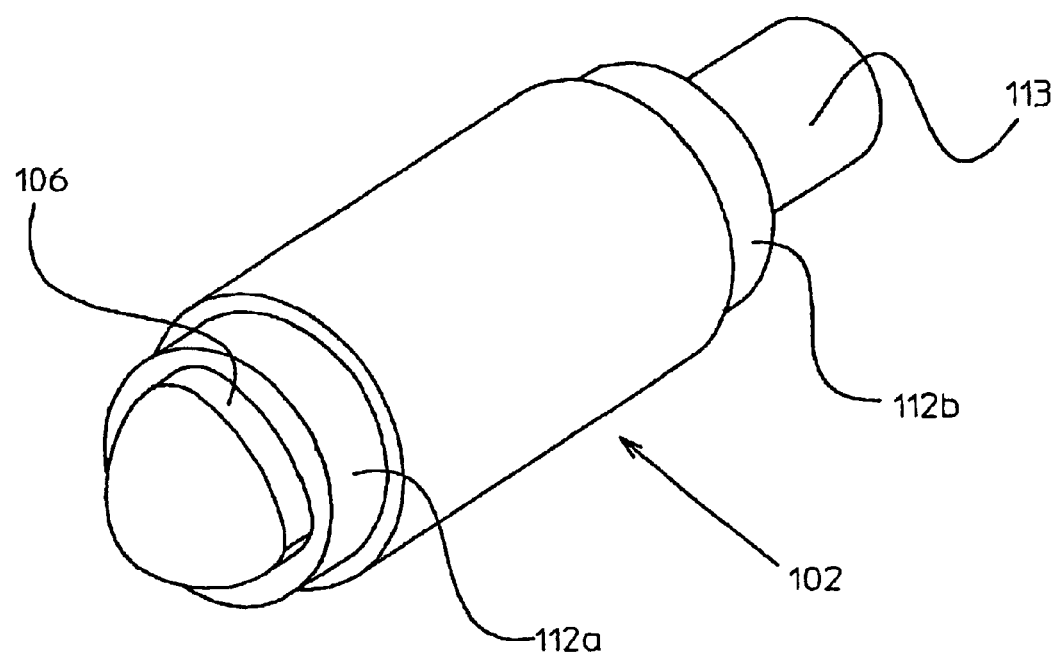
FIG. 2 is a perspective diagram showing the shaft of the motor having a resolver shown in FIG. 1.
Figure 3:
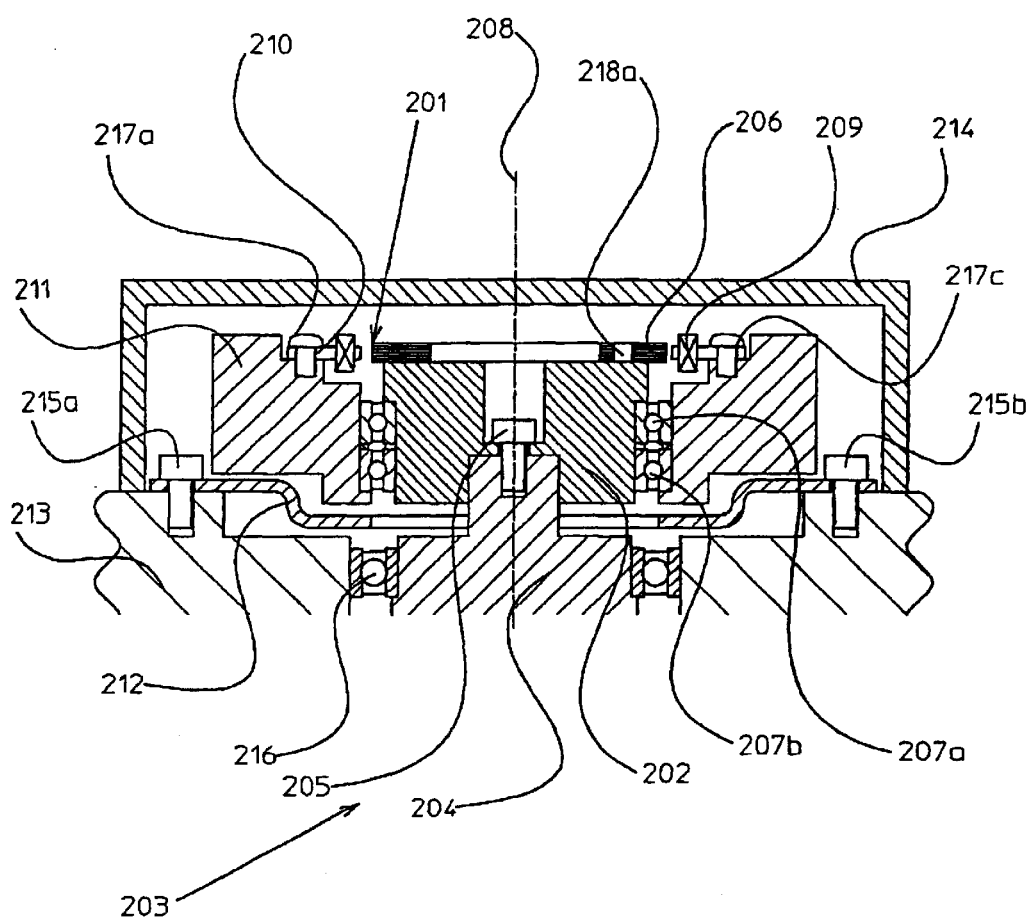
FIG. 3 is a sectional diagram showing a resolver mounting mode according to a related art.
Figure 4:
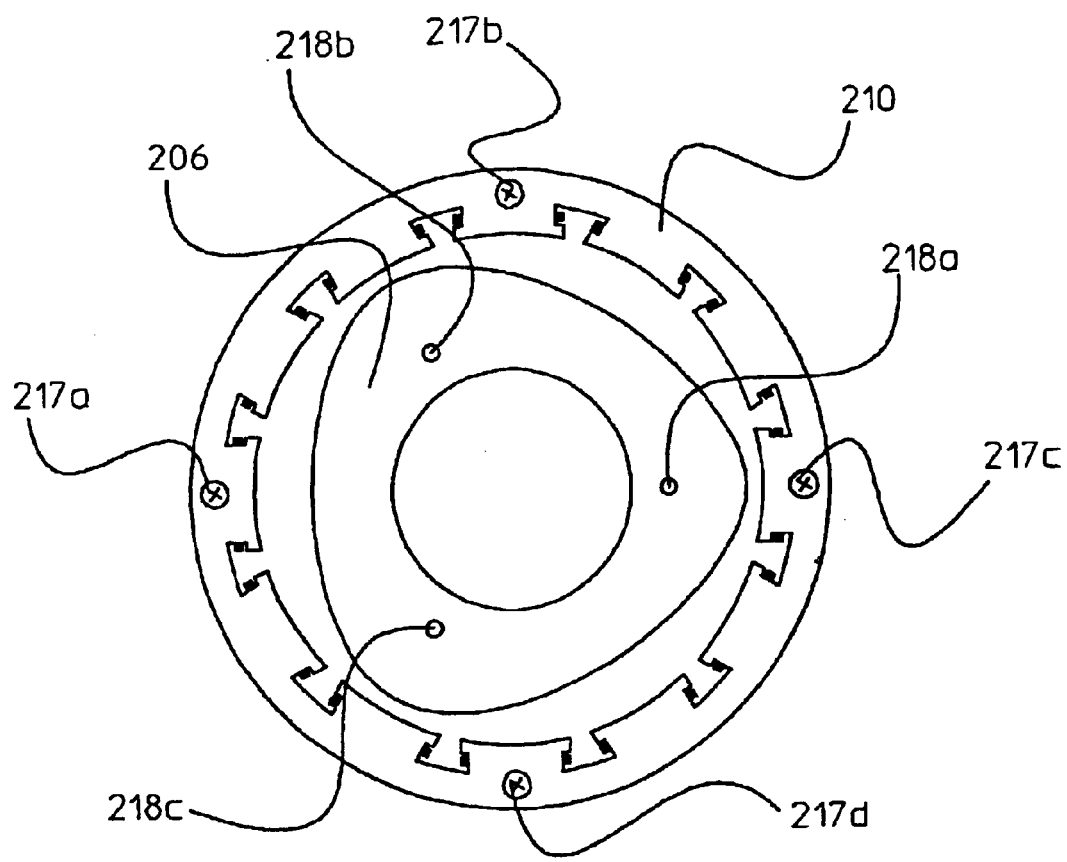
FIG. 4 is a front diagram of the resolver shown in FIG. 3.
Figure 5:
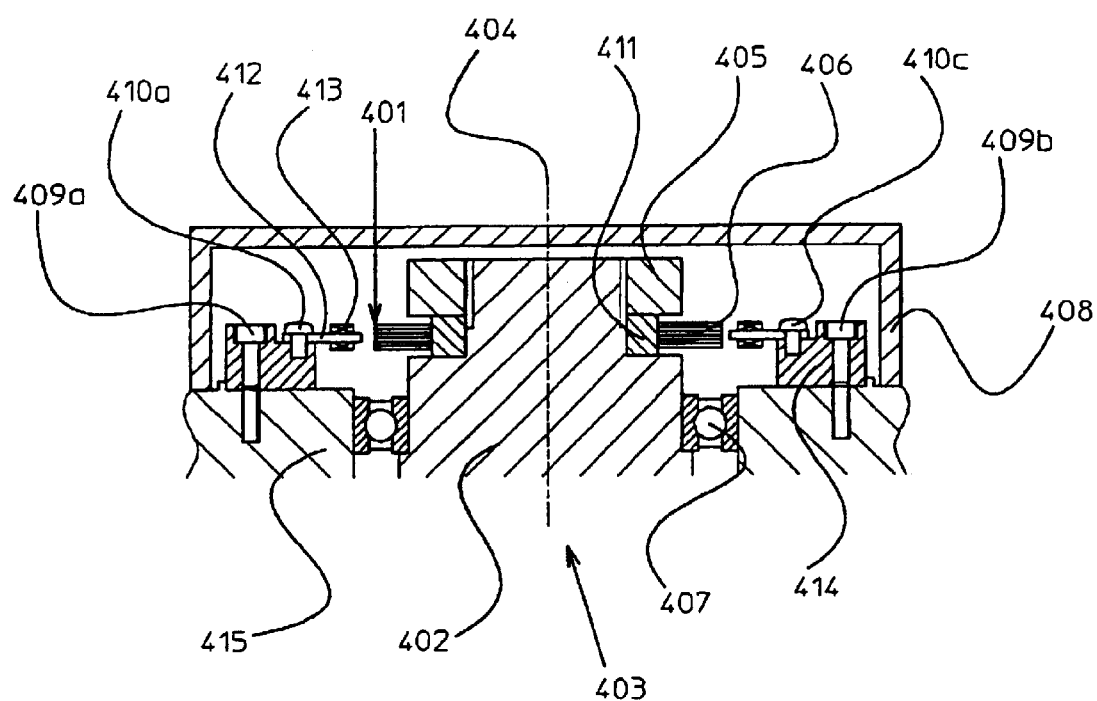
FIG. 5 is a sectional diagram showing a resolver mounting mode according to another related art.

An embodiment of the present invention will be described with reference to the accompanying drawings. In FIG. 1 is shown a cross section of a motor 103 having a resolver, and particularly a resolver configuring section of such a motor, according to one embodiment of the present invention, and a perspective appearance of a motor shaft 102 is shown in FIG. 2. A motor shaft 102 is made of a magnetic material such as a carbon steel material. The motor shaft 102 is rotatably supported by a motor bracket 105 through a non-load side bearing 107 and a load side bearing which is not shown. The motor shaft 102 is produced by machining a section 112b onto which the load side bearing is inserted, a section 112a onto which the non-load side bearing 107 is inserted, and an irregular shape 106 which becomes a rotor of a resolver 101 using a cam grinding machine, a camshaft lathe, a mealing shaft lathe, or the like while holding them in the same holding condition. The working properties of a grinding machine or a lathe ensure highly precise coaxiality or concentricity of regions worked under the same holding conditions. Therefore, a line connecting the shape centers of the load side bearing insertion section 112b and the non-load side bearing insertion section 112a, namely the center of rotation of the motor shaft 102, very precisely agree with the shape center of the irregular shape 106 as the resolver rotor along a broken chain line 104 as shown in FIG. 1. Thus, conventional working, especially working to fit the resolver rotor to the resolver shaft or the motor shaft, can be eliminated. In FIG. 2, 113 indicates an output shaft to a load.

In order to ensure the precision of the coaxiality or concentricity of a portion of the motor bracket 105 in which the bearing 107 is placed and a portion of the motor bracket 105 to which a resolver stator yoke 108 is fixed, the two parts are simultaneous manufactured using a lath or an equivalent method. The motor bracket 105 is fitted to the motor 103 with the outer circumferential surface of the bearing 107 used as a guide surface. The resolver stator yoke 108 is fixed to the motor bracket 105 with pan head machine screws 110a, 110b in such a way that the resolver stator yoke 108 does not come into contact with the inner circumferential surface of the motor bracket 105. The irregular shape 106 which ensures the positional accuracy of the resolver rotor as described above, so that the resolver stator yoke 108 can be mounted with relatively low preciseness. Because the basic principle of detection is substantially the same as that described above in connection with the prior art, its description is omitted here. Reference numeral 111 denotes a cover entirely covering the resolver configuring section of the motor 103.

The resolver rotor material in this embodiment is integral with the motor shaft, which must have sufficient rigidity and can be made of a carbon steel material such as S45c. Because carbon steel has a high eddy current loss or hysteresis loss as compared with silicon steel, permalloy, or the like used for the resolvers according to the related art, an energy conversion efficiency to convert a change in gap between the magnetic poles of the resolver rotor and the resolver stator yoke into an electric signal drops in this embodiment as compared with the prior art using silicon steel or permalloy. Therefore, the conventional concept emphasizing the energy conversion efficiency contradicts the concept of the present embodiment and invention, such that the latter cannot be easily achieved from the former. Even when the energy conversion efficiency is low, an output signal may be amplified to compensate it, and, according to this embodiment, the position can be detected at the same level as that obtained when the silicon steel or permalloy rotor is used.

Although a specific embodiment was described above, the present invention is not limited to the described configurations. The irregular shape 106 of the motor shaft 102 may, for example, be worked by knurling with reference to the load side bearing insertion section 112b and the non-load side bearing insertion section 112a of the motor shaft 102 as a reference or by rolling with the pertinent portions 112a, 112b used as a rolling standard. The motor having a resolver of the present invention can be produced by any suitable method.

While there have been described that which is at present considered to be a preferred embodiment of the invention, it is to be understood that various modifications may be made thereto, and it is intended that the appended claims cover all such modifications as fall within the true spirit and scope of the invention.

What is claimed is:

1. Resolver-integrated motor, comprising:

a motor bracket;

a motor shaft formed of a magnetic material and having a radial irregular section on a portion of its surface, said motor shaft opposing the motor bracket, from which it is separated by a prescribed gap; and a resolver stator yoke which is fixed to the motor bracket in such a way as to oppose the radial irregular section of the motor shaft; wherein:

a resolver using the radial irregular section on the motor shaft as a resolver rotor is formed as one unit of the motor.

2. The resolver-integrated motor according to claim 1, further comprising:

a bearing for supporting the motor shaft by the motor bracket, disposed adjacent to a part of the motor shaft which functions as the resolver rotor; and a member for fixing the resolver stator yoke to the motor bracket with an outer circumferential surface of the bearing used as a guide surface.

3. The resolver-integrated motor according to claim 1, wherein at least a portion where the bearing is disposed and a portion which functions as the resolver rotor on the motor shaft are manufactured by grinding or turning in the same holding state, to form the motor shaft and the resolver rotor which is integral with it so that their coaxiality or concentricity has a prescribed level or higher.

4. The resolver-integrated motor according to claim 1, wherein the motor shaft is made of a carbon steel material.

* * * * *